Sept. 25, 1951  R. H. WIEHSNER  2,568,905
CLAMPING MECHANISM FOR MOLDING APPARATUS
Filed May 28, 1948  3 Sheets-Sheet 1
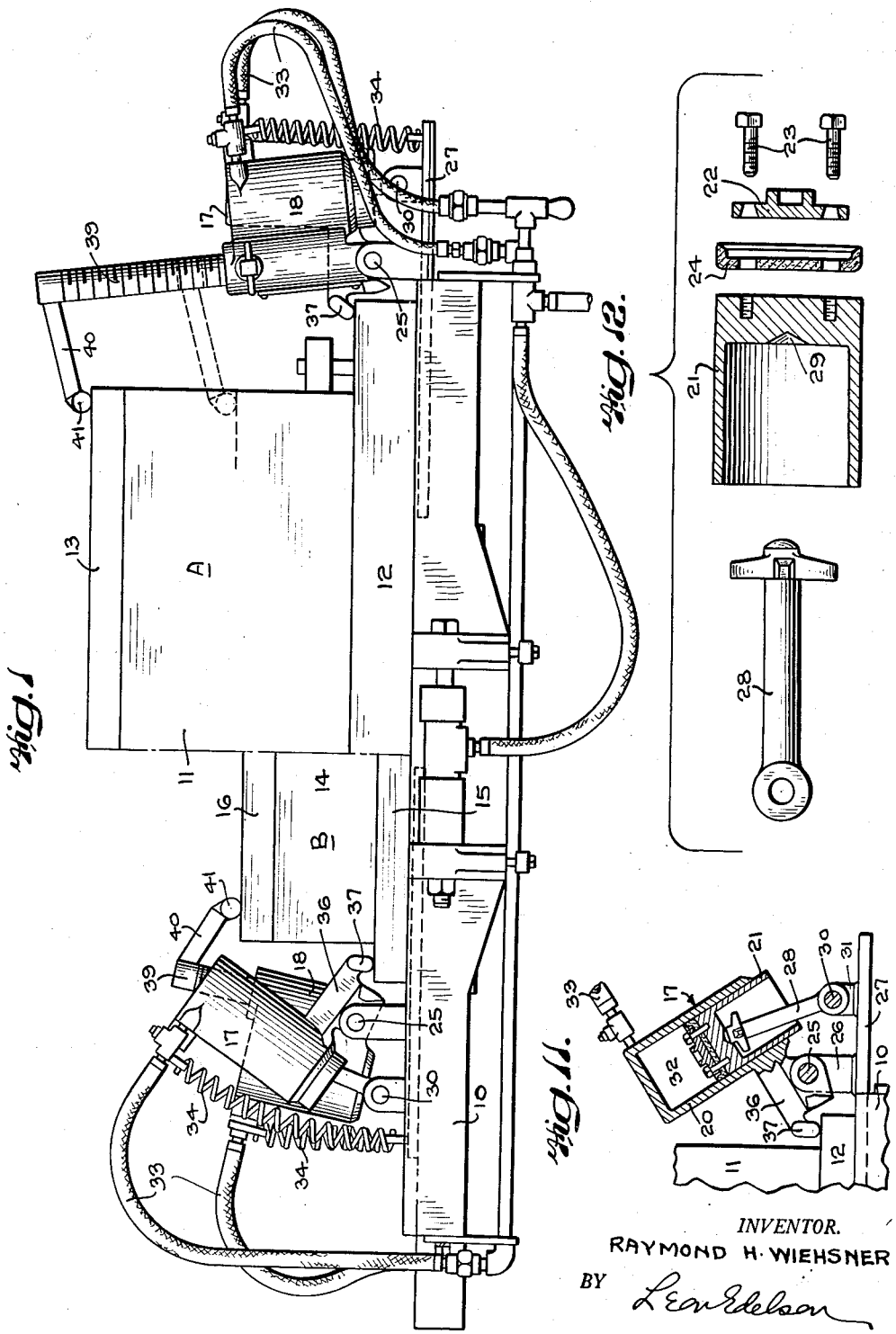
INVENTOR.
RAYMOND H. WIEHSNER
BY
ATTORNEY

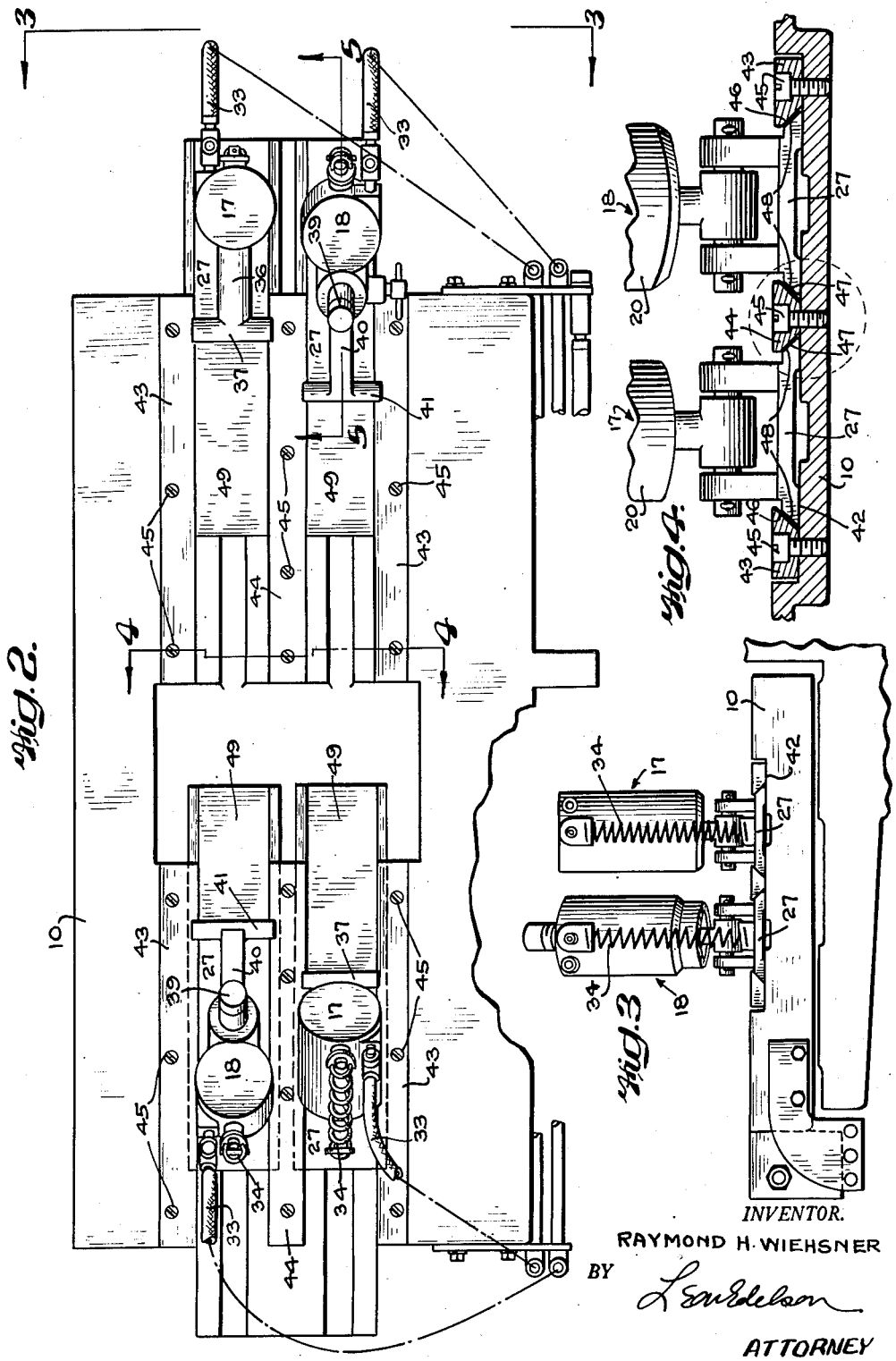

Sept. 25, 1951 R. H. WIEHSNER 2,568,905
CLAMPING MECHANISM FOR MOLDING APPARATUS
Filed May 28, 1948 3 Sheets-Sheet 3
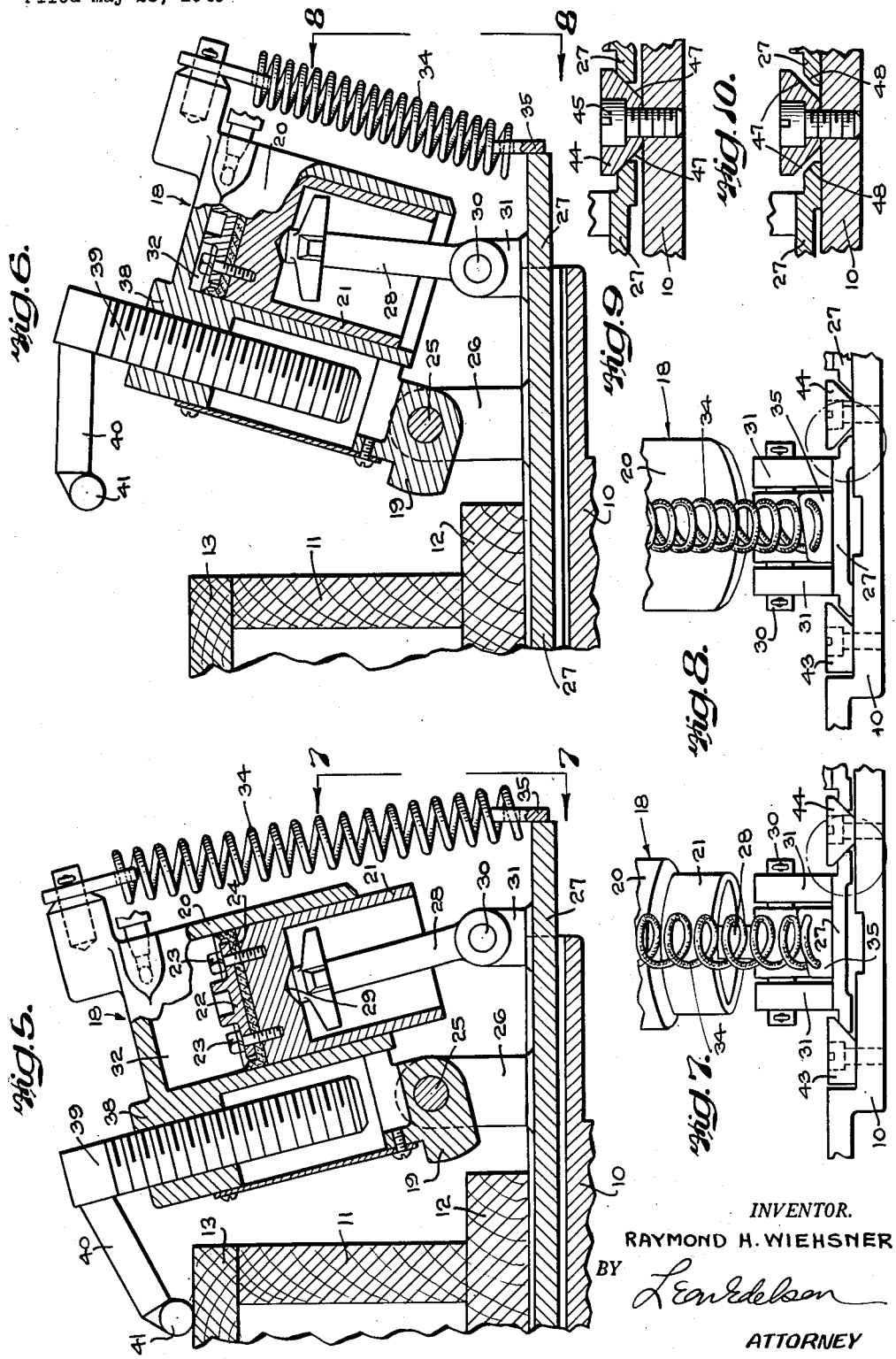
INVENTOR.
RAYMOND H. WIEHSNER
BY
ATTORNEY Patented Sept. 25, 1951

2,568,905

UNITED STATES PATENT OFFICE 2,568,905

CLAMPING MECHANISM FOR MOLDING APPARATUS

Raymond H. Wiehsner, Philadelphia, Pa., assignor to The Tabor Manufacturing Company, Philadelphia, Pa., a corporation of Pennsylvania Application May 28, 1948, Serial No. 29,775

3 Claims. (Cl. 22—33)

This invention relates generally to molding apparatus and more particularly to an improved mechanism for quick-releasably clamping either a core box and its associated core plate or a pattern board and its associated flask and bottom board securely in position upon the supporting table of a roll-over molding machine.

Among the principal objects of the present invention is to provide a set of pneumatically-operated clamping mechanisms which are selectively operative to engage the top and bottom members of a mold unit (either a core box or a flask), the clamping mechanisms being so arranged in laterally spaced pairs that while one mechanism of a pair is engageable with the bottom member of the mold unit to one side of its longitudinal center, the other mechanism of the pair is engageable with the top member of the mold unit to the other side of said center, the corresponding mechanisms of each pair thereof being thus operative to engage diagonally opposite points of the mold member to be secured in position.

A further object of the present invention is to provide pneumatically-operated clamps which are respectively mounted upon individual slides to facilitate quick and easy individual adjustment of the clamps into and out of work-clamping position, the slides being so selectively shiftable in suitable ways formed in the work-supporting table of the roll-over molding machine that upon pneumatic operation of a positionally adjusted clamp it is automatically locked against displacement from its work-clamping position.

Other objects and advantages of the present invention will be apparent hereinafter, it being understood that the invention hereof consists in the combination, construction, location and relative arrangement of parts, all as will be described in detail hereinafter, as shown in the accompanying drawings and as finally pointed out in the appended claims.

In the accompanying drawings,

Figure 1 is a side elevational view of the work-supporting table of a roll-over molding machine showing the clamp mechanisms mounted thereon in accordance with the present invention;

Figure 2 is a top plan view of the apparatus as shown in Figure 1;

Figure 3 is an end elevational view of the apparatus as it appears from the line 3—3 of Figure 2;

Figure 4 is a transverse sectional view as taken on the line 4—4 of Figure 2;

Figure 5 is a longitudinal sectional view of one of the clamping mechanisms as taken on the line 5—5 of Figure 2, showing the same in operative work-clamping position;

Figure 6 is a view corresponding to Figure 5, but showing the mechanism in its inoperative position;

Figure 7 is a partial elevational view as taken from the line 7—7 of Figure 5;

Figure 8 is a partial elevational view as taken from the line 8—8 of Figure 6;

Figures 9 and 10 are enlarged sectional views of the portion inscribed within the dotted line circle of Figure 4 respectively showing the relative arrangement of the slide within its guideway when the clamping mechanism is operatively clamped in position and when it is released from such position;

Figure 11 is a vertical sectional view of one of the clamp mechanisms engageable with the bottom member of a mold unit; and Figure 12 is an exploded view of the cylinder and piston assembly for operating the clamp mechanism under fluid pressure.

Referring now more particularly to the drawings, it will be observed that the apparatus of the present invention is incorporated in a roll-over molding machine having a work-supporting table 10. Inasmuch as the molding machine forms no part of the present invention and may be of any conventional type, it will not be described herein, it being merely sufficient to point out for an understanding of the present invention that the table 10 of the molding machine is carried by the latter and is adapted to be inverted as is well understood in the art. It will further be understood that this table 10 serves as the support for a mold unit which in one instance may consist of a core box having a base member permanently secured to and enclosing the bottom of the box in association with a removable core plate adapted to enclose the top of the core box, and which in a second instance may consist of a pattern board upon the upper surface of which is adapted to be disposed a flask, the top of which is closed by a so-called bottom board. These mold units are each shown in Figure 1 which illustrates the adaptability of the apparatus of the present invention to clampingly secure one or the other of these mold units upon the work-supporting table 10 of the molding machine.

In said Figure 1 the flask assembly, designated generally by the reference letter A, consists of a flask 11 resting upon a separable pattern board 12, the top of the flask being closed by a removable bottom plate 13. In the case of the core box assembly, designated generally by the reference letter B, it may consist of a hollow core box 14 the bottom of which is permanently closed by a base member 15, the top of the box being closed by a removable core plate 16. It will be noted that the pattern board 12 of the flask assembly A projects beyond the external perimeter of the flask 11 to provide a freely extending marginal portion which is adapted to be engaged by the clamp mechanisms of the present invention to secure the pattern board firmly in position upon the work-supporting table 10. Similarly, in the case of the core box assembly B, its base member 15 extends beyond the external perimeter of the core box 14 to provide a freely extending marginal portion which is likewise engageable by the clamp mechanisms of the present invention to secure the core box in position upon the work-supporting table.

The clamp mechanisms of the present invention are each generally similar in construction and operation, four such mechanisms being mounted upon the work-supporting table, these mechanisms being arranged in laterally spaced pairs at opposite ends of the table, the mechanisms of each pair being spaced laterally so that one clamp of a given pair of the mechanisms may clampingly engage the pattern board 12 of the flask A or the base member 15 of the core box B, while the other clamp of said given pair of mechanisms may engage the bottom board 13 of the flask A or the removable core plate 16 of the core box B. The clamps of the opposed pair of mechanisms are arranged to engage corresponding members of the core box A or of the flask B, the general arrangement being such that when all four clamp mechanisms are operatively actuated the bottom member of the mold unit is engaged at two points to secure it to the work-supporting table, while the top member of the mold unit is also engaged at two points to secure it to the mold unit and so close the top thereof.

For clarity of description, the term "mold unit" as employed in the following specification and in the claims is intended to embrace both the flask assembly A and the core box assembly B which are adapted to be interchangeably supported upon the table 10 of the molding machine. The pattern board 12 of the flask A and the base member 15 of the core box B will be referred to hereinafter as the "bottom member" of the mold unit, while the removable core plate 16 of the core box B and the bottom board 13 of the flask A will be referred to hereinafter as the "separable top member" of the mold unit.

As most clearly appears in Figures 1 and 2, the laterally spaced pairs of clamping mechanisms hereinbefore referred to are respectively designated by the reference numerals 17 and 18, it being noted that one such pair of clamp mechanisms is disposed at each end of the work-supporting table 10. The clamping mechanism 17 of each pair is adapted to engage the bottom member of the mold unit (as see Figures 1 and 11), while the clamp mechanism 18 of each pair is adapted to engage the separable top member of the mold unit (as see Figures 1 and 5).

As most clearly appears in Figure 2, the one pair of clamping mechanisms 17—18 are reversely arranged relatively to the other pair thereof so that the corresponding mechanisms of each pair are respectively disposed to either side of the longitudinal center line of the table 10. Thus, the clamp mechanisms 17—17 are operated to engage diagonally opposite points of the bottom member of the mold unit, while the mechanisms 18—18 are operative to engage diagonally opposite points of the top member of said unit.

Each of the clamping mechanisms essentially includes a fluid pressure cylinder 20 within which is slidably fitted a piston 21 to the inner end of which is suitably secured, as by a plate 22 and securing screws 23, a gasket 24 to provide a fluid-tight fit between the slidably associated cylinder and piston. The cylinder 20 is provided adjacent its lower open end with a laterally extending mounting boss 19 which is pivotally secured, as by a pivot pin 25 to support 26 secured to and extending upwardly from a longitudinally extending base member 27 slidably mounted in the table 10 in the manner to be presently described. The piston 21 is provided with a follower rod 28, the inner end of which bears centrally against the inner end wall of the piston, as at 29, while its outer end is pivoted, as at 30, upon a support 31 also secured to and extending upwardly from the longitudinally extending base member 27.

The slidably associated cylinder and piston constitute, in effect, a single acting fluid pressure motor which is operative, upon delivery of a pressure fluid into the cylinder chamber 32, to cause the cylinder to move axially outwardly with respect to its piston, while simultaneously causing the cylinder to rock about its pivot 25. This rocking movement of the cylinder about its pivot 25 is best evident from a study of Figures 5 and 6, which latter figure shows the cylinder in its initial position prior to delivery of the pressure fluid into the chamber 32. As the pressure fluid is forced into this chamber, the cylinder is constrained to move axially with respect to its associated piston, but inasmuch as the cylinder is pivotally secured as at 25 the cylinder is necessarily restricted to move in an arcuate path about the pivot 25 as a center from its position shown in Figure 6 into its clamping position shown in Figure 5. The pressure fluid for operating each of the clamp mechanisms is delivered to the cylinder chamber 32 in each instance by way of a flexible conduit 33 leading to a suitable source of fluid pressure supply, each of these conduits being suitably provided with valve means for controlling the pressure fluid delivered to and discharged from the fluid pressure chamber 32. In order to insure return of the clamping mechanism to its inoperative position, as shown for example in Figure 6, a coiled tension spring 34 is interposed between the upper end of the cylinder 20 and a fixed element 35 on the longitudinally slidable base 27, this spring being extended, as in Figure 5, when the clamp mechanism is actuated under fluid pressure to rock cylinder 20 about its pivot 25.

In the case of the clamp mechanisms 17—17 which are each adapted to clampingly engage the bottom member of the mold unit, as for example the base 15 of a core box assembly B or the pattern board 12 of a flask assembly A, the cylinder 20 thereof is provided with a laterally extending clamp arm 36, the outer free end of which is provided with a transversely extending bar 37 adapted to rest upon and engage the freely extending marginal end portion of the bottom member of the mold unit. The laterally extending clamp arm 36 of each of the mechanisms 17—17 extends from the lower end of the cylinder 20 as an integral extension thereof.

In the case of the clamping mechanisms 18—18 which are respectively adapted to clampingly engage the top member of the mold unit, as for example, the removable core plate 16 of a core box assembly B or the bottom board 13 of a flask assembly A, the cylinder 20 of each of said mechanisms 18—18 is provided adjacent its outer end with an internally threaded integral boss 38 into which is threadedly fitted an elongated screw 39. Extending radially from the outer end of this screw 39 is a clamp arm 40 the free end of which is provided with a transversely extending clamp bar 41 which is adapted to rest upon and firmly engage the top member of the mold unit.

It will be noted that the axis of the screw 39 is parallel to the axis of its associated cylinder 20, and it will be apparent that by rotating the screw 39 in one direction or the other within its threaded bearing 38 the screw may be axially adjusted to accommodate the clamping arm 40 to mold units of different overall heights, the adjustment of the screw 39 being in each instance such that when the cylinder 20 of a clamping mechanism 18 is rocked under fluid pressure into its operative position shown in Figure 5 the clamp bar 41 will engage the top member of the mold unit and hold it securely in position.

Inasmuch as the base member 15 of a core box assembly B or the pattern board 13 of a flask assembly A are generally of a uniform thickness, there is no necessity for adjusting the clamp arms 36 of mechanism 17—17 to vary its effective height above the work-supporting table 10 of the molding machine.

As appears most clearly in Figures 2, 3 and 4, the longitudinally extending supporting base 27 for each of the clamping mechanisms is individually slidably mounted within a suitable guideway formed in the top of the work-supporting table 10. To this end the table 10 is milled to provide a longitudinally extending channel 42 of a width sufficient to receive therein a pair of laterally spaced longitudinally extending base members 27 and a set of guide rails consisting of a pair of outer rails 43—43 and an intermediate rail 44. These rails 43—43—44 are respectively secured to the table 10 in longitudinally extending parallel relation by means of suitable screws 45. As most clearly appears in Figure 4, the inner faces of the outer rails 43—43 are each beveled as at 46, while the opposed faces of the intermediate rail 44 are respectively correspondingly beveled as at 47—47.

The longitudinally extending outer edges of the slidable base members 24 are respectively beveled as at 48—48 in correspondance with the reverse bevels of the fixed embracing rails 43—44, the general arrangement being such as to provide for each of the longitudinally extending clamp mountings a guideway which contains the slide mounting against vertical displacement while permitting it to be longitudinally slidable therewithin. The normal fit of each mounting 27 within its guideway is such as to permit relatively free sliding movement of the mounting lengthwise of the guideway so as to quickly and easily locate each of the clamping mechanisms in position to operatively engage the mold unit to be secured upon the table 10 of the molding machine. The inner portion of each slide, as designated by the numeral 49 in Figure 2, is adapted, of course, to underlie the bottom of the mold unit.

Prior to fluid pressure actuation of a clamping mechanism to effect clamping engagement of its clamp arm against the mold unit, as shown in Figures 1, 5 and 11, the slidable mount 27 for each clamping mechanism is positioned within its individual guideway, as most clearly shown in Figures 8 and 10, in which position the mounts 27 are freely slidable within their respective guideways. However, when a clamp mechanism is actuated under fluid pressure supplied thereto to effect engagement of its clamping arm against the top or bottom member of a mold unit as hereinbefore described, continued application of the fluid pressure tends to rotate the clamp mechanism as a unit about the clamp bar in engagement with the mold unit, the clamp bar thus serving as a fulcrum for such rotative tendency. The clamp mechanism thereby raises its slidable mount 27 into tight frictional engagement with the oppositely beveled surfaces of the slide guideway and so holds the slide securely in position against longitudinal displacement relatively to the clamped mold unit. Immediately upon release of the fluid pressure, the clamp mechanism is returned to its operative position, as shown in Figure 6, in which latter position the slideable mount 27 is again free to be shifted longitudinally along its guideway.

In view of the fact that the several clamp mechanisms are individually carried upon their own slidable mounts, each clamp mechanism is adapted for individual placement in proper operative position relatively to the work to be secured. Because of this capability for selective operation of the several clamp mechanisms, mold units of varying sizes and shapes may be conveniently and readily secured in position upon the table 10 of the molding machine. Thus, for example, while one pair of the clamping mechanisms may be positioned to secure to the supporting table a pattern board of a given size, the other pair of mechanisms may be individually adjusted in position to clamp in place a flask bottom board which may vary considerably in size with respect to the pattern board. Moreover, the individual operation of the several clamping mechanisms makes it possible to release the core plate of a core box assembly while retaining the core box in position upon the table, while in the case of a flask assembly, such individual operation of the several clamping mechanisms makes it possible to hold the pattern board securely in position upon the molding machine table while permitting removal of the flask and its bottom board.

It will be understood, of course, that the present invention is susceptible to various changes and modifications which may be made from time to time without departing from the general principles or real spirit thereof and it is, accordingly, intended to claim the present invention broadly, as well as specifically, as indicated in the appended claims.

What is claimed as new and useful is:

1. In a mold apparatus of the character described, a supporting table for a mold unit to be secured thereto, an elongated plate-like slide longitudinally shiftable substantially in the plane of the table, a fluid-pressure cylinder pivotally mounted upon said slide, a clamp arm carried by the cylinder for clamping engagement with a part of said mold unit, and a piston member slidably fitted in said cylinder and also pivotally mounted upon said slide, the pivot for the cylinder being external thereof and the pivot for the piston member being in alinement with the axis of the cylinder and both pivots being spaced longitudinally along said slide whereby upon fluid-pressure movement of said cylinder axially of its associated piston member the former rocks about its pivot substantially in a vertical plane extending longitudinally along said slide, and a guideway for said slide within which the latter is adapted to be frictionally locked upon fluid-pressure-actuation of the cylinder to effect clamping engagement of the clamp arm against a part of the mold unit.

2. In a mold apparatus as defined in claim 1 wherein said cylinder is provided with an integral clamp arm extending substantially radially of the cylinder and lengthwise of the slide.

3. In a mold apparatus as defined in claim 1 wherein said cylinder is provided with a clamp arm extending substantially radially of the cylinder and lengthwise of the slide, and wherein means are provided for adjusting said clamp arm along a line extending parallel to the axis of said cylinder to vary the effective distance between said clamp arm and the supporting table.

RAYMOND H. WIEHSNER.

REFERENCES CITED

The following references are of record in the file of this patent:

UNITED STATES PATENTS

| Number | Name | Date |
|---|---|---|
| 971,687 | Ramsden | Oct. 4, 1910 |
| 1,746,219 | Lewis | Feb. 4, 1930 |
| 1,922,446 | McCullough | Aug. 15, 1933 |

FOREIGN PATENTS

| Number | Country | Date |
|---|---|---|
| 513,140 | Germany | Nov. 22, 1930 |